(12) United States Patent
Chang et al.

(10) Patent No.: US 9,477,264 B2
(45) Date of Patent: Oct. 25, 2016

(54) WINDOW MEMBER FOR DISPLAY SCREEN OF PORTABLE TERMINAL AND METHOD FOR FABRICATING THE WINDOW MEMBER

(75) Inventors: Min-Su Chang, Incheon (KR); Soon-Ho Han, Gyeonggi-do (KR); Duck-Yong Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 656 days.

(21) Appl. No.: 13/616,278

(22) Filed: Sep. 14, 2012

(65) Prior Publication Data
US 2013/0077225 A1 Mar. 28, 2013

(30) Foreign Application Priority Data
Sep. 27, 2011 (KR) ........................ 10-2011-0097358

(51) Int. Cl.
G06F 1/00 (2006.01)
G06F 1/16 (2006.01)
B29L 31/34 (2006.01)
B29L 31/44 (2006.01)
(Continued)

(52) U.S. Cl.
CPC ......... *G06F 1/1643* (2013.01); *B29C 45/2708* (2013.01); *B29C 2045/0027* (2013.01); *B29L 2031/3437* (2013.01); *B29L 2031/445* (2013.01); *G06F 3/0412* (2013.01); *G06F 2203/04103* (2013.01); *Y10T 428/24488* (2015.01)

(58) Field of Classification Search
CPC ............... G06F 1/1601; G06F 1/1643; B32B 2457/20; B32B 2457/202; B32B 2457/204; B32B 2457/206; B32B 2457/208

USPC ........... 361/679.21, 679.22, 679.26, 679.41, 361/679.55; 156/245; 428/157, 1.1
See application file for complete search history.

(56) References Cited

U.S. PATENT DOCUMENTS 4,185,220 A * 1/1980 Oberg .................. H01J 29/896
313/478
6,859,251 B2 * 2/2005 Wang .................... G02F 1/1339
349/158
(Continued)

FOREIGN PATENT DOCUMENTS

CN 1825923 A 8/2006
CN 101324820 A 12/2008
(Continued)

OTHER PUBLICATIONS

Chinese Search Report dated Jun. 24, 2016.

*Primary Examiner* — Courtney Smith
*Assistant Examiner* — Zhengfu Feng
(74) *Attorney, Agent, or Firm* — Cha & Reiter, LLC

(57) ABSTRACT

Provided are a window member for a display device of a portable terminal and a method for fabricating the window member. An inner surface of the window member is formed as a flat surface from a first end portion to a position adjacent to a second end portion, and an inner surface of the second end portion is formed inclined with respect to the flat surface in a direction toward an outer surface. According to the window member and the method for fabricating the same, shrinkage is minimized during hardening of melt resin by sufficiently delivering injection pressure for the melt resin over the entire molding space of a mold, thereby improving a product defect rate.

16 Claims, 3 Drawing Sheets

(51) Int. Cl.
  *B29C 45/27* (2006.01)
  *B29C 45/00* (2006.01)
  *G06F 3/041* (2006.01)

(56) References Cited

U.S. PATENT DOCUMENTS

| | | | |
|---|---|---|---|
| 8,305,512 B2* | 11/2012 | Ju | G02F 1/133512 |
| | | | 349/58 |
| 2002/0003711 A1* | 1/2002 | Hashimoto | G02B 6/0028 |
| | | | 362/551 |
| 2004/0114345 A1* | 6/2004 | Kim | G02B 6/0021 |
| | | | 362/613 |
| 2006/0098153 A1* | 5/2006 | Slikkerveer | G02F 1/133305 |
| | | | 349/187 |
| 2006/0209502 A1* | 9/2006 | Sakata | G06F 1/1601 |
| | | | 361/679.22 |
| 2010/0066936 A1* | 3/2010 | Garrett et al. | 349/58 |
| 2010/0124002 A1 | 5/2010 | Kobayashi et al. | |
| 2010/0259813 A1 | 10/2010 | Kawase et al. | |
| 2011/0032180 A1* | 2/2011 | Kawase et al. | 345/107 |
| 2011/0151937 A1* | 6/2011 | Kusuda et al. | 455/566 |
| 2011/0261513 A1* | 10/2011 | Tho | B29C 70/763 |
| | | | 361/679.01 |
| 2012/0242588 A1* | 9/2012 | Myers | G06F 1/1637 |
| | | | 345/173 |

FOREIGN PATENT DOCUMENTS

| | | |
|---|---|---|
| CN | 101740140 A | 6/2010 |
| CN | 101861546 A | 10/2010 |
| KR | 20-0419703 Y1 | 6/2006 |

* cited by examiner

WINDOW MEMBER FOR DISPLAY SCREEN OF PORTABLE TERMINAL AND METHOD FOR FABRICATING THE WINDOW MEMBER

CLAIM OF PRIORITY

This application claims the benefit under 35 U.S.C. §119(a) of a Korean Patent Application filed in the Korean Intellectual Property Office on Sep. 27, 2011 and assigned Serial No. 10-2011-0097358, the entire disclosure of which is hereby incorporated by reference.

BACKGROUND

1. Technical Field

The present disclosure generally relates to an electronic device including a display device, and more particularly, to a window member for a display device of a portable terminal and a method for fabricating the window member.

2. Description of the Related Art

In general, a portable terminal such as a mobile communication terminal, smartphone, portable multimedia device, etc., includes a display device to present images and information to the user. "Display device", as used herein, includes light generating elements, e.g., pixels and their controlling electronics, touchscreen sensor elements (for touchscreen displays) and a transparent window member. The window member protects the display device and allows images to be transmitted therethrough. Hereinafter, a display device of a portable terminal will be referred to interchangeably as simply a "screen" of the portable terminal. A window member will be referred to interchangeably as simply a "window".

A portable terminal may include a separate input device such as a keypad or track pad to input information. However, as various functions such as Internet access, multimedia reproduction, etc. have been recently incorporated into modern portable terminals, a trend has developed to include a touch screen function into the screen (this type of screen is referred to herein as a "touchscreen"). Thus a screen of sufficient size is mounted on the portable terminal for Internet access or multimedia functions, and in consideration of portability, functions of input and output devices have been implemented through the touchscreen, instead of including a separate input device. In this way, the portable terminal can be miniaturized while the size of the screen can be increased.

With the widespread use of portable terminals, effort has been steadily exerted to improve the user experience as well as functionality of the exterior of the portable terminal. As an approach to improve the user experience, a method for forming the screen as a curved surface has been proposed. For example, a screen having a slight concave surface at the edges of the screen may improve the feel of a smartphone along the contour of the user's cheek during a phone call. A concave surface may also allow certain images to be displayed with a unique or interesting appearance. The concave surface may be formed in just the lengthwise orientation of the screen.

Generally, the window member of a touch screen is frequently contacted by a user, so that the window needs to secure sufficient surface hardness. This need can be satisfied by using reinforced glass for the window. However, to minimize screen distortion, much time and cost are expended for processing the surface of the reinforced glass. Moreover, generation of a defect due to chips in the glass during processing lowers yield.

Therefore, a method for fabricating a window member as a curved surface by using an injection-molded product has been proposed. In the case of the injection-molded product, formation of one or more burrs in the fabricated injection-molded product is inevitable due to resin remaining in a mold gate. (A mold gate contains an aperture through which resin is injected to form the product; some excess resin inevitably remains attached to the product via the aperture after the resin forming the product hardens.) When the window member is fabricated with the injection-molded product to minimize formation of burrs, typically the mold is designed with only one melt-resin gate formed in the mold. Moreover, if the gate is disposed in the center of the mold for molding the window member, the screen is likely to be distorted. Therefore, it is desirable to position the gate in a portion of the mold corresponding to an edge of the window member, which is thicker than the central region. Further, to prevent the burr from being formed on an outer side of the window, i.e., the portion of the window that interfaces with a user, it is desirable to dispose the melt-resin gate on a portion of the mold interfacing with an inner side of the injection-molded product forming the window.

FIG. 1 is a side view of an injection-molded product 10 forming a window member according to the related art. An inner side 11 has a generally flat surface, and an outer side 13 has a curved surface such that the thickness of the window member increases toward both side ends thereof. A burr 19 is formed on the inner side 11 at a right end portion of the window, due to synthetic resin remaining in the melt-resin gate of the mold, as mentioned previously. The burr 19 is removable by separate processing such as grinding or the like.

However, since the window 10 is formed using only one melt-resin gate (not shown) disposed slantly toward a side of the mold, when the window is molded to have the curved surface, sufficient pressure is not delivered to the melt resin in a position far away from the gate, i.e., at the left end portion of window 10. As a result, the density of the window member is not uniform during hardening of the injected melt resin, or the injection-molded product shrinks in its portion to which the pressure for injecting the melt resin is not sufficiently delivered. These problems can cause deviation of the density or thickness distribution of the window member from a design requirement, eventually distorting the screen displayed through the display device.

SUMMARY

In aspect of the present disclosure, a window member is provided which has a density distribution that is substantially uniform. The window is formed via an injection molding technique that prevents contraction of the resulting injection-molded product during hardening thereof. A method for fabricating the window member is also provided.

According to an aspect of the present invention, there is provided a window member for a display device of a portable terminal The window member has first and second end portions on opposite sides, and inner and outer surfaces. The inner surface is formed as a flat surface from the first end portion to a position adjacent to the second end portion. The inner surface further includes a far end surface portion formed inclined with respect to the flat surface portion in a direction toward the outer surface.

In another aspect, a method for fabricating a touchscreen for a portable terminal comprises injecting melt synthetic resin into a mold and hardening the resin to form a window member comprising first and second end portions on opposite sides, and inner and outer surfaces. An ITO film is laminated onto the inner surface of the window member to form the touchscreen. The inner surface of the window member is formed as a flat surface in a direction from a first end portion to a position adjacent to the second end portion, and as an inclined surface at the second end portion, which is inclined with respect to the first flat surface in a direction toward the outer surface.

BRIEF DESCRIPTION OF THE DRAWINGS

The above and other features and advantages of exemplary embodiments of the present invention will be more apparent from the following detailed description taken in conjunction with the accompanying drawings, in which.

DETAILED DESCRIPTION OF EXEMPLARY EMBODIMENTS

Hereinafter, exemplary embodiments of the present invention will be described in detail with reference to the accompanying drawings. The detailed descriptions of functions and configurations incorporated herein that are well known to those skilled in the art will be omitted to avoid unnecessarily obscuring the present invention.

Figure 2:
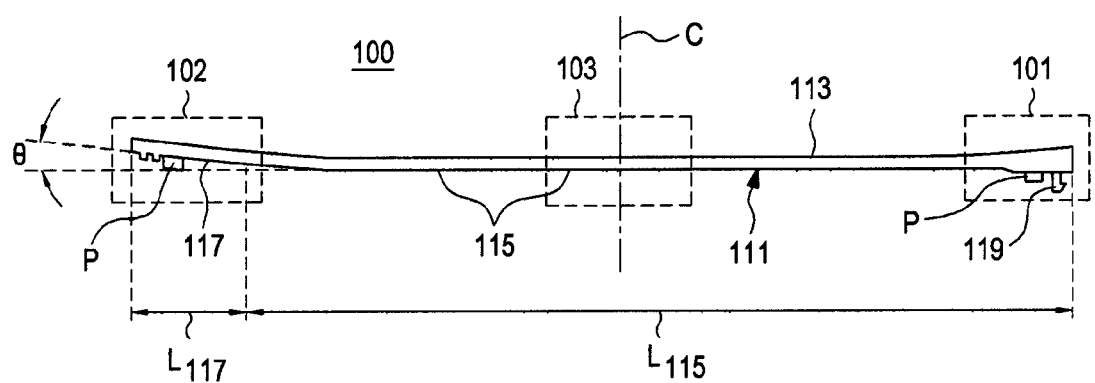
FIG. 2 is a side view of a window member according to an embodiment of the present invention.

FIG. 2 is a side view of an embodiment of a window member ("window") in accordance with the invention, designated as 100. Window 100 has an outer surface 113 formed as a curved surface, and an inner surface 111 comprised of inner surface portions 115 and 117. Surface portion 115 is generally flat, and extends a distance $L_{115}$ along the length of the window 100. Surface portion 117 is inclined at a fixed or gradually varying angle θ relative to surface portion 115, towards the outer surface 113, and extends a distance $L_{117}$ in the lengthwise direction of window 100. Window 100 includes a "gate end" portion (first end portion) 101 and a far end (second end) portion 102, described further below. Surface portion 117 is an inner surface of far end portion 102, and will thus be referred to as a far end inner surface portion 117. Surface portion 117 will also be referred to as an inclined surface.

In some implementations, window 100 can be configured just to protect a display device (to which it is a part), while passively transferring images generated by the display device. In this case, i.e., a non-touch-screen application, it is unnecessary to provide a separate film to be attached onto the inner surface 111 or outer surface 113 to realize a touch screen function. However, since the window 100 is a component exposed to the exterior, a film for reinforcing surface hardness or a coating layer may be formed onto the outer surface 113 to prevent surface damage.

In other implementations, the window 100 forms a part of a touch screen. In this case, an Indium-Tin Oxide (ITO) film 129 (shown in FIG. 4 and discussed below) may be attached onto the inner surface 111 of window 100, to sense touch input to the outer surface 113 and responsively perform a touch screen function. For the touch screen implementation, a film for reinforcing surface hardness or a coating layer may also be formed on outer surface 113 to prevent surface damage.

The window member 100 is molded by injecting melt resin into a mold. The melt resin used for molding the window 100 may be polymethylmethacrylate (PMMA) resin, polycarbonate (PC) resin, or the like.

Figure 3:
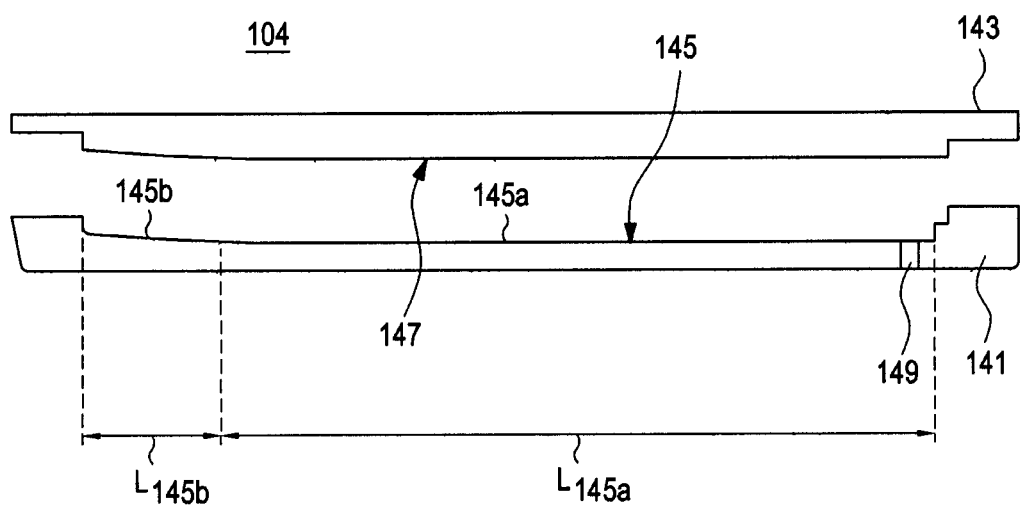
FIG. 3 is a structural diagram of an example mold for molding the window member shown in FIG. 2.

FIG. 3 shows an example mold, 104, for molding the window 100. The mold 104 includes a first (lower) mold part 141 and a second (upper) mold part 143 which, when coupled or assembled to each other, form a mold space therebetween having the shape of window 100. Window 100 can thus be formed via injection molding. Lower mold part 141 has a molding surface 145 corresponding to the contour of window 100, more specifically, to the inner surface 111 of the injection-molded product. Upper mold 143 has a molding surface 147 with a contour corresponding to the outer surface 113 of the window 100. A melt-resin gate 149 "connected to" a molding space of the mold 104 is formed in the lower mold part 141 at a suitable position of the molding space corresponding to the first (gate) end portion 101 of the window 100.

The molding surface 145 of the lower mold part 141 includes first and second surface portions 145a and 145b. First surface portion 145a is a generally flat surface extending lengthwise a distance $L_{145a}$ to correspond to inner surface 115 of window 100. Second surface 145b extends lengthwise a distance $L_{145b}$ on an incline at the angle θ (see FIG. 2) with respect to surface 145a. Surface 145b is in a shape corresponding to the contour of inner surface 117 of window 100. Thus surface 145b can be generally flat, or alternatively curved, depending on the design of inner surface 117 (discussed below). Gate 149 includes an aperture, i.e., a "through hole", extending through lower mold part 141, through which resin is injected. Gate 149 is thus "connected" to the molding space of the mold 104 through first surface 145a.

The molding surface 147 of the upper mold part 143 is formed as a curved surface overall, with a concave shape corresponding to the contour of outer surface 113 of window 100. Thus, molding surface 147 has a curved surface on the right side thereof (as shown) corresponding to the outer surface 113 from the first end portion 101 to a center portion 103 of window 100. The right side surface portion gradually approaches the molding surface 145 of lower mold part 141, more specifically, the first flat surface 145a in a direction from the first end portion 101 to the center portion 103. Similarly, the left side portion of surface 147 follows the contour of the left side portion of outer surface 113 of window 100.

Moreover, the molding surface 147 of the second mold 143 corresponding to an outer surface from the center portion 103 to the position adjacent to the second end portion 102 of the window member 100 gradually retreats from the molding surface 145 of the first mold 141, more specifically, a flat surface including the first flat surface 145a in a direction toward the second end portion 102. The molding surface (147) of the second mold 143 corresponding to the second end portion 102 of the window member 100 extends in parallel with the second flat surface (145b) overall. However, the molding surface 147 of the second mold 143 corresponding to the outer surface 113 of the window member 100 may be formed to be symmetric with respect to a center line C of the window member 100.

The left and right end portions of upper mold part 143 are suitably designed to contact the left and right end portions of lower mold part 141 at points sufficient to achieve the desired thicknesses of the various portions of window 100.

Figure 1:
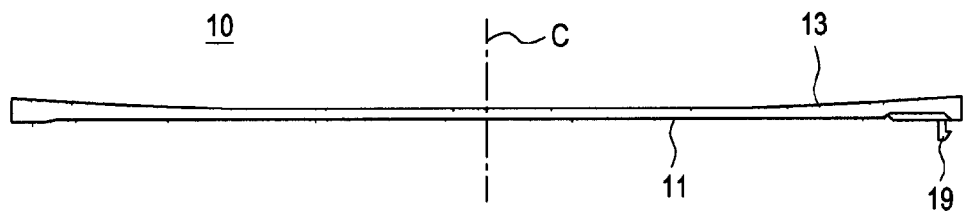
FIG. 1 is a side view of an injection-molded product forming a window member according to an embodiment of related art.

When the window 100 is molded using the above-described mold 104, melt resin is injected through the gate 149. As mentioned previously, in the case of a conventional window member, as shown in FIG. 1, a molding space of a mold is relatively small at the center of the mold (in a portion corresponding to the center line C), such that injection pressure for the melt resin is not sufficiently delivered to an end portion positioned away from a gate. As a result, when the conventional window member is injection-molded, the window member tends to shrink at the end portion positioned away from the gate, increasing a defect rate.

When the window member 100 according to the present disclosure is molded, a mold (104) is used which is formed such that at a far end portion (proximate surface 145b) positioned away from the gate 149, the far end mold space is both inclined with respect to the orientation of the central space, and has a comparable thickness to the central space. That is, the thickness of the far end mold space is not substantially larger than the central mold space, in contrast to the conventional mold forming the window of FIG. 1. Therefore, although a center portion of the molding space (forming central region 103) becomes small, injection pressure for the melt resin can be uniformly delivered across the entire molding space.

In the conventional window member shown in FIG. 1, the maximum thickness of both side end portions is 2 mm and the minimum thickness of the center portion is 1 mm. In the window member 100 shown in FIG. 2, example thicknesses are as follows: the maximum thickness of the first end portion 101 can be about 2 mm, the minimum thickness of the center portion 103 can be about 1 mm, and the thickness of the second end portion 102 can be about 1.2 mm. The foregoing thickness distribution of the window member (100) may be set variously. However, it is preferable that the minimum thickness of the thinnest portion, i.e., the center portion 103 is more than 0.6 mm and less than 1.4 mm overall, and the maximum thickness of the first end portion 101 is more than 1.2 times and less than 2.2 times the minimum thickness of the center portion (103). The thickness of the second end portion 102 is preferably more than 0.4 times and less than 1.3 times the minimum thickness of the center portion (103).

In other words, in an exemplary embodiment, the thickness of the far end portion 102 can be set within a tolerance range of a minimum thickness of center portion 103. In an embodiment, the thickness of the far end portion can be set to be substantially the same as, or smaller than, the minimum thickness of the center portion 103. However, since the inner surface in the second end portion 102 is inclined with respect to the flat surface, the outer surface 113 may have a curved surface such that the outer surface 113 at the first end portion 101 and the outer surface 113 at the second end portion 102 are symmetric to each other or have a profile similar thereto.

Referring still to FIGS. 2 and 3, in some implementations, surface portion 117, which is inclined with respect to surface portion 115, is a generally flat surface. Incline angle θ is defined by the intersection of a tangent line to any point on surface portion 117, and, a line extending from surface portion 115. Incline angle can be in the range of 5 to 10 degrees, e.g. 8 degrees. If surface portion 117 is a relatively flat surface, incline angle θ is substantially constant over the extent of surface portion 117. In alternative implementations, however, surface portion 117 is curved in the same manner as the contour of the outer surface 113. In this case, the incline angle θ gradually increases along surface portion 117 in a direction away from surface portion 115. Whether the surface portion 117 is relatively flat or curved, the outer surface 113 of the window member 100 according to the present invention may have a curved surface of the same profile as the outer surface of the conventional window member, and the inner surface 111 of the window member 100 according to the present invention is formed to have a different shape than the conventional window member.

In an embodiment, the thickness of the window member 100 decreases in a direction from the first end portion 101 to the center portion 103, and the thickness of the second end portion 102 is uniform overall. In the region from the center portion 103 to the position adjacent to the second portion 102, the thickness can be designed to slightly increase in some implementations, without compromising quality. Even if the outer surface 113 of the window member 100 is a curved surface at the second end portion 102, the second inner surface 117 may be a flat surface. However, it is preferable that a portion of the second end portion 102 which meets the first inner surface 115, and an end portion of the window member 100 (i.e., the left-most portion thereof shown in FIG. 2) have the same thickness.

Due to synthetic resin remaining on the gate 149, a burr 119 may be formed on the inner surface 111 of the window member 100, and may be removed by processing such as grinding or the like. Once the burr 119 is removed, the window member 100 is assembled to a device, such as a portable terminal, etc., by using double-side tape, an adhesive, or the like.

Window 100 can be embodied to include protrusions "p" to facilitate attachment to the electronic device to which it becomes a part. The protrusions p are formed via corresponding apertures within mold 104. Attachment of window 100 to the electronic device via the protrusions can be via press fit to corresponding holes within the electronic device housing.

As mentioned previously, the ITO film 129 (see FIG. 4) is laminated onto the inner surface 111 of the window member 100, and according to product specifications, a bezel may be printed on an edge portion of the window member 100. The ITO film 129 is a film on which transparent electrodes in a grid array are formed. Coordinates on the film 129 where a user's contact is made are recognized to generate a signal. Coordinates of an icon, etc., displayed on the screen and coordinates of the array of the transparent electrodes are arranged for use in realization of a touch screen. Generally, the ITO film is attached onto the window member by roll-lamination processing.

Figure 4:
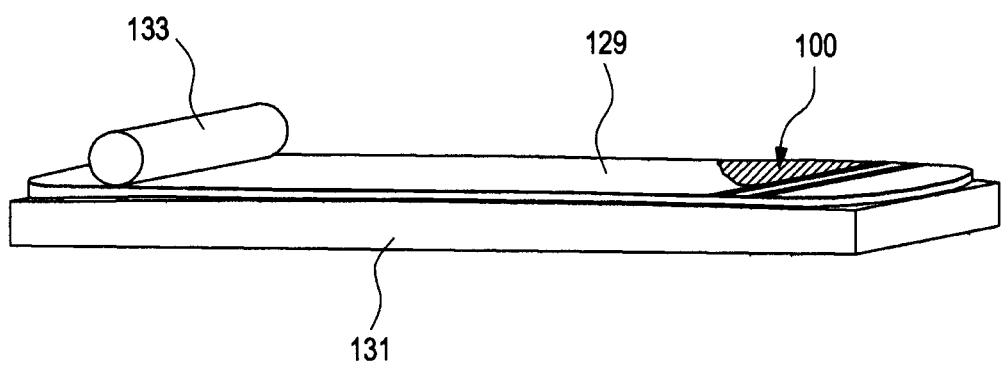
FIGS. 4 through 6 are diagrams for sequentially showing an example process of laminating an Indium-Tin Oxide (ITO) film onto an injection-molded product of a window member shown in FIG. 2 to form a touchscreen.
Figure 5:
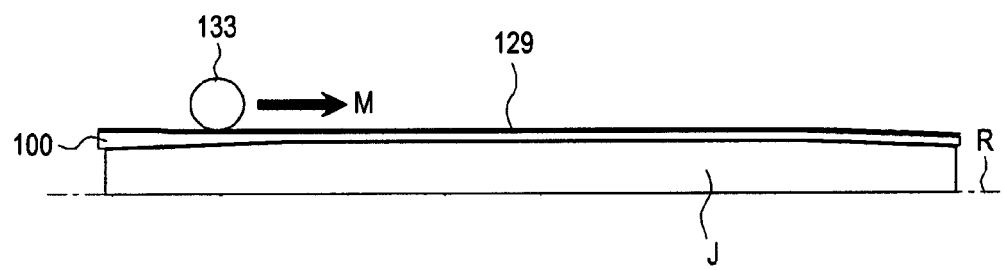

FIGS. 4 and 5 illustrate an example process of attaching an ITO film (129) onto the inner surface 111 of window 100 to fabricate a touchscreen. In this process, window 100 is first placed and fixed on a jig (J) 131 with outer surface 113 against the jig 131 and inner surface 111 facing up. (Window 100 is shown in a cut-away view in FIG. 4.) Adhesive or double-sided tape is then applied along the perimeter of inner surface 111 and/or the ITO film 129. The ITO film 129 is then positioned on the inner surface 111 of window 100. Thereafter, a roller 133 moves from the first end portion 101 of window 100, such that the pressure of the roller 133 causes the ITO film 129 to attach to the inner surface 111 of window 100 via the double-sided tape or adhesive. The jig 131 is disposed on a reference surface R parallel with a moving direction M of the roller 133. The roller 133, while moving along the first inner curved surface 115 of the window 100, attaches the ITO film 129 onto the first inner curved surface 115 of the window member 100.

Figure 6:
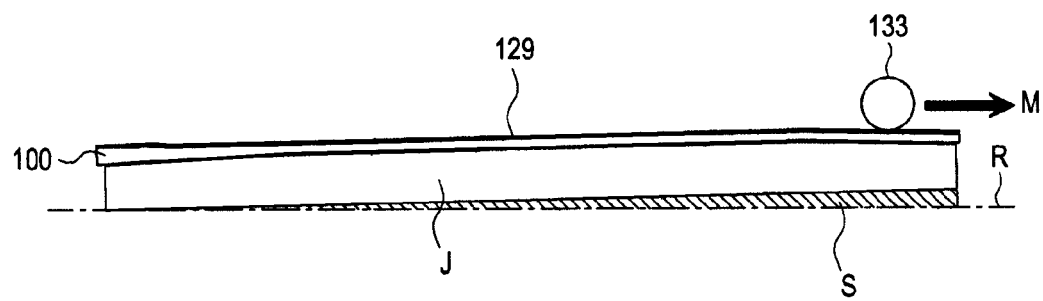

As shown in FIG. 6, to attach the ITO film 129 onto the second end portion 102 of the window member 100, the jig 131 may be disposed on an incline such that the second inner surface 117 may be oriented in parallel with the reference surface R. The jig 131 incline with respect to surface R may be realized using a suitable inclined shim "S" or the like. That is, since the second inner surface 117 is inclined with respect to the first inner surface 115, the jig 131 is disposed on an incline such that the second inner surface 117 is oriented in parallel with the moving direction (M) of the roller 133. However, a height difference between the first inner surface 115 and the second inner surface 117 can be less than 1 mm, and therefore, in this case the ITO film 129 may also be laminated while maintaining the inclined state of the second inner surface 117 with respect to the moving direction (M) of the roller 133 without moving the jig 131.

Figure 7:
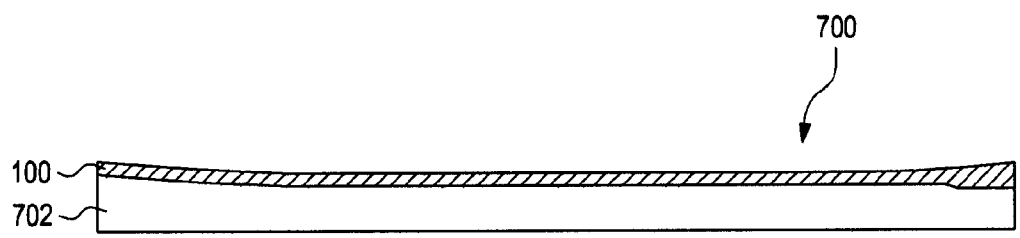
FIG. 7 is a side view of an example electronic device including the window of FIG. 2.

FIG. 7 is a side (lengthwise) view of an example electronic device, 700, including the window 100 as part of a screen thereof, such as a touchscreen. In this embodiment, device 700 is generally rectangular, and window 100 is concave in the lengthwise direction. In other implementations, window 100 can be curved along the edges in the width-wise direction as well. Device 700 can be a smartphone, tablet device, a music player, or any other portable electronic device advantageously utilizing a curved screen.

As is apparent from the foregoing description, according to the present disclosure, the mold is fabricated such that the outer surface of the window member is formed as a curved surface in a portion positioned away from the melt-resin gate, and the thickness of the window member is maintained relatively uniform between a central portion and a far end portion, thereby sufficiently delivering injection pressure for the melt-resin over the entire molding space of the mold. In this way, shrinkage can be minimized during hardening of the melt resin, improving a product defect rate. Hence, distortion of images displayed through the screen can be prevented while forming the outer surface of the window member as a curved surface. Moreover, it is unnecessary to use reinforced glass in fabrication of the window member, reducing the manufacturing cost of the window member and contributing to improving the user experience of an electronic device incorporating the screen, such as a portable terminal and so forth.

While the invention has been shown and described with reference to exemplary embodiments thereof, it will be understood by those skilled in the art that various changes in form and details may be made therein without departing from the scope of the invention as defined by the appended claims and their equivalents.

What is claimed is:

1. A window for a display device of a portable terminal, the window comprising first and second end portions on first and second opposite sides, and inner and outer surfaces, wherein the inner surface is formed as a flat surface portion extending from the first end portion to a position adjacent the second end portion, and a far end surface portion formed inclined with respect to the flat surface portion in a direction toward the outer surface; and wherein,
the window is formed entirely via a single mold,
the first end portion is thicker than the second end portion,
the inner surface is asymmetric with respect to a center line between the first and second end portions, and
the outer surface is substantially symmetric with respect to the center line.

2. The window of claim 1, wherein the window has a maximum thickness of about 2 mm at the first end portion, a minimum thickness of about 1 m at a center portion between the first and second end portions, and a thickness of about 1.2 mm at the second end portion.

3. The window of claim 1, wherein the window has a thickness which gradually decreases in a direction from the first end portion to a center portion between the first and second end portions, and which gradually increases in a direction from the center portion to the position adjacent to the second end portion.

4. The window of claim 3, wherein the window has a maximum thickness of about 2 mm at the first end portion and a minimum thickness of about 1 mm at the center portion.

5. The window of claim 1, wherein the second end portion, the inner surface and the outer surface extend in parallel with each other.

6. The window of claim 5, wherein a thickness of the window at the second end portion is about 1.2 mm.

7. The window of claim 1, wherein the outer surface of the window is formed as a curved surface such that a thickness of the window gradually decreases in a direction from the first end portion to a center portion between the first and second end portions, gradually increases from the center portion to the position adjacent to the second end portion, and is substantially constant at the second end portion.

8. The window of claim 7, wherein the window has a maximum thickness of about 2 mm at the first end portion, a minimum thickness of about 1 mm at the center portion, and a thickness of about 1.2 mm at the second end portion.

9. The window of claim 1, further comprising in combination therewith, an Indium-Tin Oxide (ITO) deposition film attached onto the inner surface.

10. The window of claim 1, wherein a thickness of the first end portion is more than 1.2 times and less than 2.2 times a minimum thickness of a center portion between the first and second end portions, and a thickness of the second end portion is more than 0.4 times and less than 1.3 times the minimum thickness of the center portion.

11. The window of claim 10, wherein the minimum thickness of the center portion is more than 0.6 mm and less than 1.4 mm.

12. A portable electronic device comprising the window of claim 1.

13. The window of claim 1, wherein the inner surface portion of the second end portion begins to incline at the position adjacent the second end portion.

14. The window of claim 1, wherein the outer surface has a flat central portion and is concave at each of the first and second end portions.

15. The window of claim 1, wherein the window has a continuous form throughout an entire structure thereof.

16. The window of claim 1, further comprising a plurality of protrusions formed on the inner surface, for attachment of the window to the portable terminal.

* * * * *